United States Patent
Cho et al.

(10) Patent No.: US 9,548,832 B1
(45) Date of Patent: Jan. 17, 2017

(54) MEDIA STREAMING SYNCHRONIZATION

(75) Inventors: James Cho, Mountain View, CA (US); William J. McFarland, Los Altos, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1386 days.

(21) Appl. No.: 12/820,058

(22) Filed: Jun. 21, 2010

Related U.S. Application Data

(62) Division of application No. 11/197,773, filed on Aug. 3, 2005, now Pat. No. 7,792,158.

(60) Provisional application No. 60/602,723, filed on Aug. 18, 2004.

(51) Int. Cl.
*H04J 3/06* (2006.01)
*H04N 21/43* (2011.01)
*H04N 21/4363* (2011.01)

(52) U.S. Cl.
CPC .............. *H04J 3/067* (2013.01); *H04J 3/0664* (2013.01); *H04N 21/4305* (2013.01); *H04N 21/43637* (2013.01)

(58) Field of Classification Search
USPC ........................................ 370/503, 509, 512
See application file for complete search history.

(56) References Cited

U.S. PATENT DOCUMENTS

| | | |
|---|---|---|
| 4,622,665 A | 11/1986 | Jonsson et al. |
| 5,583,854 A | 12/1996 | Beesley |
| 5,878,234 A | 3/1999 | Dutkiewicz et al. |
| 5,949,794 A | 9/1999 | Chiodini |
| 5,966,387 A | 10/1999 | Cloutier |
| 6,078,930 A | 6/2000 | Lee et al. |
| 6,347,084 B1 | 2/2002 | Hulyalkar et al. |
| 6,452,908 B1 | 9/2002 | Yamada et al. |
| 6,510,150 B1 | 1/2003 | Ngo |
| 6,539,489 B1 | 3/2003 | Reinert |
| 6,778,493 B1 | 8/2004 | Ishii |
| 6,785,261 B1 | 8/2004 | Schuster et al. |
| 6,816,510 B1 * | 11/2004 | Banerjee ........................ 370/503 |
| 6,839,339 B1 | 1/2005 | Chuah |
| 6,868,094 B1 | 3/2005 | Bordonaro et al. |
| 6,934,760 B1 | 8/2005 | Westbrook et al. |
| 6,944,188 B2 | 9/2005 | Sinha et al. |
| 6,975,655 B2 | 12/2005 | Fischer et al. |
| 7,035,246 B2 | 4/2006 | Taylor |
| 7,051,246 B2 | 5/2006 | Benesty |
| 7,092,410 B2 | 8/2006 | Bordonaro et al. |
| 7,206,327 B2 | 4/2007 | Lorek et al. |
| 7,301,966 B2 | 11/2007 | Metcalf |
| 7,315,546 B2 | 1/2008 | Repko et al. |

(Continued)

*Primary Examiner* — Gary Mui
(74) *Attorney, Agent, or Firm* — Holland & Hart LLP

(57) ABSTRACT

A system and method for closely synchronizing the transmission of real-time data streams is described. Synchronization data is transmitted by a cycle master for receipt by one or more cycle slaves. A cycle slave updates an internal state based on synchronization data received from the cycle master. This internal state may govern reproduction of received real-time data streams by the cycle slave. Such synchronization data may be inserted into transmitted media streams. The cycle slave internal state may be more accurately set by calculating timing differences between the cycle master and cycle slave and periodically adjusting that internal state between receipt of the synchronization data from the cycle master.

17 Claims, 7 Drawing Sheets

(56) References Cited

U.S. PATENT DOCUMENTS

| | | | |
|---|---|---|---|
| 7,333,517 B2 | 2/2008 | Madhavapeddi et al. | |
| 7,359,406 B2 | 4/2008 | Holloway et al. | |
| 7,366,204 B2 * | 4/2008 | Kang et al. | 370/503 |
| 7,397,877 B2 * | 7/2008 | Miao | 375/356 |
| 7,448,061 B2 | 11/2008 | Richards et al. | |
| 7,512,069 B2 | 3/2009 | Hedayat et al. | |
| 7,545,794 B2 | 6/2009 | Loukianov | |
| 7,567,815 B2 | 7/2009 | Nishikawa et al. | |
| 7,583,705 B2 | 9/2009 | Sinha et al. | |
| 8,149,880 B1 | 4/2012 | Cho et al. | |
| 2002/0027928 A1 | 3/2002 | Fang | |
| 2002/0141451 A1 | 10/2002 | Gates et al. | |
| 2004/0008661 A1 | 1/2004 | Myles et al. | |
| 2004/0066801 A1 | 4/2004 | Fujishiro | |
| 2004/0208201 A1 | 10/2004 | Otake | |
| 2004/0228367 A1 | 11/2004 | Mosig | |
| 2004/0233923 A1 | 11/2004 | Fally et al. | |
| 2005/0152330 A1 | 7/2005 | Stephens et al. | |
| 2005/0163078 A1 * | 7/2005 | Oba | H04L 63/08 370/331 |
| 2005/0259754 A1 | 11/2005 | Ho et al. | |
| 2005/0286564 A1 | 12/2005 | Hatley et al. | |
| 2006/0251124 A1 | 11/2006 | Colmant et al. | |
| 2007/0014315 A1 | 1/2007 | Zumsteg | |
| 2007/0032241 A1 * | 2/2007 | Busch | H04B 7/022 455/450 |
| 2007/0140154 A1 | 6/2007 | Chun | |
| 2008/0075121 A1 | 3/2008 | Fourcand | |
| 2008/0279173 A1 | 11/2008 | Zhang et al. | |
| 2009/0135854 A1 | 5/2009 | Bettin et al. | |
| 2009/0225790 A1 | 9/2009 | Shay et al. | |

* cited by examiner

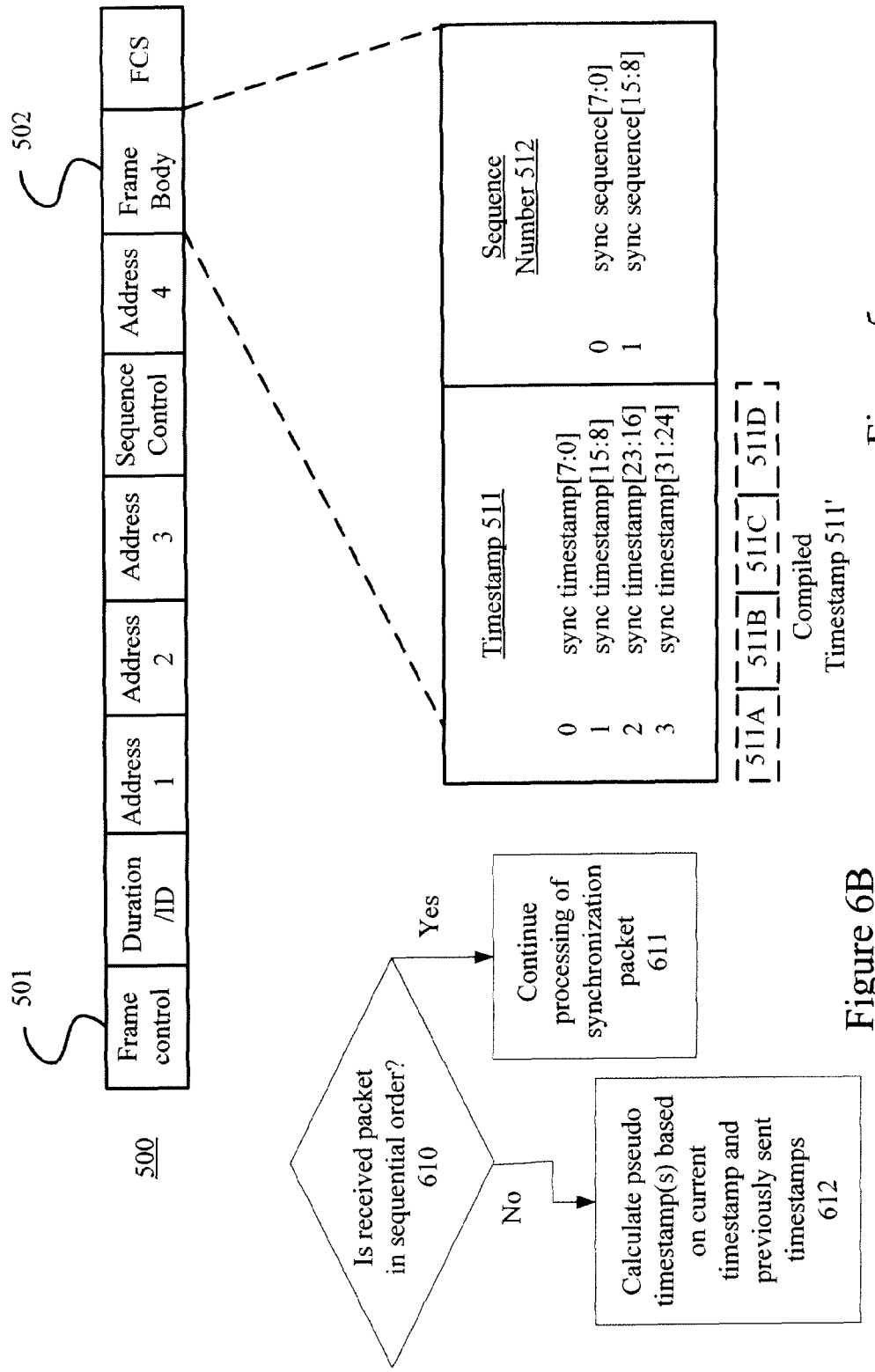

MEDIA STREAMING SYNCHRONIZATION

RELATED APPLICATIONS

This application is a divisional of U.S. patent application Ser. No. 11/197,773, entitled "Media Streaming Synchronization" filed Aug. 3, 2005 which claims priority of U.S. Provisional Patent Application 60/602,723, entitled "Media Streaming Synchronization" filed Aug. 18, 2004.

BACKGROUND OF THE INVENTION

Field of the Invention

The present invention relates to data communication and, more particularly, to the synchronization of clocks in a media data source device and an end device for displaying the media data.

Description of the Related Art

Wireless networking can now advantageously provide the wireless distribution of entertainment streaming media to consumers. For example, the Sharp model LC-15L1U-S television can receive streaming audio/video streams from a DVD player using an IEEE 802.11b-based wireless network.

When media traffic is transferred over a wireless network, two different transport models can be used. In a first transport model, called a "pull" model, a receiver coupled to the end device (e.g. the television) requests data when it is needed from the source device (e.g. the DVD player). In this model, the receiver must predict when to request data from the source device such that the data will arrive, even in the event of transient transport failures and latency, in time for display. In a second transport model, called a "push" model, the transmitter coupled to the source device transmits data at a constant rate to the receiver (and thus the end device) for display.

In the push model, the rate at which the data enters the transmitter from the source device (i.e. the transmission rate) should match the rate that the data leaves the receiver to the end device (i.e. the consumption rate), with a fixed latency. Ensuring that the consumption rate substantially equals the transmission rate over a long period of time requires that the clocks of the transmitter and the receiver be synchronized. For example, in MPEG-2 based video stream transport, maintaining time synchronization between the transmitter and the receiver on the order of ±500 nanoseconds (ns) is desirable.

Problematically, drift between similarly specified system clocks could be on the order of 40 parts-per-million (ppm). For example, when a transmitter clock operating at 40 MHz is 20 ppm slow, a receiver clock also operating at 40 MHz could be 20 ppm fast. Although the IEEE 802.11 family of wireless networking standards provides a time synchronization function (TSF), the granularity of the synchronization promulgated is at best 1 microsecond (µs). Specifically, the IEEE 802.11 family of wireless networking standards calls for time synchronization to take place during beacon transmissions, which typically occur with a 100 millisecond period. As a result, using worst-case relative clock rate offsets, a 4 µs timing error between transmitter and the receiver could accumulate between beacons.

Therefore, a need arises for a method and system for more closely synchronizing the transmitter and the receiver in a digital media transport system.

SUMMARY OF THE INVENTION

To transport real-time digital media streams with low jitter over a wireless network, clocks in a cycle master and a cycle slave need to be accurately synchronized. Unfortunately, the 1999 IEEE 802.11 family of standards fails to ensure the desired level of synchronization. In accordance with one aspect of the invention, a synchronization packet can be sent from the cycle master to the cycle slave, thereby providing a highly accurate time synchronization function. Specifically, this synchronization packet provides an end-to-end solution in which the media streams entering the cycle master can leave the cycle slave with very low jitter (e.g. on the order of ±500 ns).

Each synchronization packet includes a current value of a cycle master timestamp before it enters the transmit queue. A demarcation that has substantially the same latency from a transmission-determined event and a receive-determined event can be used to minimize fixed and variable timing errors. For example, a "medium_free" event (also called "rx_clear" in the industry) can function as such a demarcation. In general, timing reference point (TRP) events (measured using stable, detectable points within the packets) in combination with received synchronization packets can be used to update a cycle slave timestamp. This updated cycle slave timestamp can be advantageously used to gate the media stream.

Thus, in general, a method of synchronizing the clocks in master and slave devices using a wireless network is described. In this method, a synchronization packet can be sent (or received) over the wireless network. Advantageously, this synchronization packet can be used to ensure a timing error less than 4 µs between the master and slave devices. Sending the synchronization packet can include generating the synchronization packet using a master timestamp associated with the master device. At this point, the synchronization packet can be inserted between data packets. The master timestamp in the master device can be generated by a master oscillator coupled to a master timestamp timer.

Receiving the synchronization packet can include receiving packets over the wireless network. Advantageously, a non-synchronization packet can be distinguished from the synchronization packet. After the synchronization packet is identified, the master timestamp can be extracted from the synchronization packet.

Receiving the synchronization packet can further include detecting a TRP event in the slave device and initializing a timestamp delta counter in the slave device based on the TRP event. A slave timestamp stored in a slave timestamp timer can be updated based on a value in the timestamp delta counter and the slave timestamp. Notably, the slave timestamp timer and the timestamp delta counter are incremented by a slave oscillator.

In one application benefiting from this fine-level synchronization, a media packet can be gated based on a gate control signal derived from an output of the slave timestamp timer. In one embodiment, the gate control signal can be the output of the slave timestamp timer. In another embodiment, the gate control signal can be the output of the slave timestamp timer added to an offset value. Advantageously, using the synchronization packet can reduce jitter between the master and slave devices to ±500 ns.

In one exemplary embodiment, first and second timestamps in first and second synchronization packets from the master device can be received over the wireless network. A TRP event in the slave device can be used to trigger an increase in a count value. This count value can be measured from a first defined point of the first synchronization packet and a second defined point of the second synchronization packet. The slave timestamp can be updated using this count value. Notably, the first timestamp, the second timestamp, and the count value can be incremented using oscillators having nominally fixed frequencies, wherein the slave device knows the frequency of the master device. In one embodiment, the oscillators can have substantially the same frequency.

In one embodiment, updating the slave timestamp can include summing the first timestamp and the count value. In another embodiment, the method can further include adding an offset to an updated slave timestamp.

A system in a cycle master for synchronizing clocks of the cycle master and another device is also described. This system can include a master oscillator, a master timestamp timer, a synchronization packet generator, and a synchronization insertion block. The master timestamp timer can increment based on cycles of the master oscillator. The synchronization packet generator can generate synchronization packets, wherein each synchronization packet includes a timestamp stored by the master timestamp timer. The synchronization insertion block can insert each synchronization packet into a stream of data packets for transmission over a wireless network.

A system in a cycle slave for synchronizing clocks of the cycle slave and another device is also described. This system can include a slave oscillator, a slave timestamp timer, a TRP event detection block, and a timestamp delta counter. The slave timestamp timer can increment based on cycles of the slave oscillator. The TRP event detection block can generate a TRP event signal. The timestamp delta counter can increment based on cycles of the slave oscillator, receive the TRP event signal, and trigger an update of the slave timestamp timer.

The system in the cycle slave can further include a summing block that receives a master timestamp and a count stored by the timestamp delta counter to generate an update value. This summing block can then update the slave timestamp timer with the update value. The timestamp delta counter can advantageously be initialized by the TRP event signal. Additionally, the timestamp delta counter can generate the count by using the TRP event signal to measure between a first defined point of a first synchronization packet including the timestamp and a second defined point of a second synchronization packet including another timestamp.

In one embodiment, synchronizing clocks can include sending or receiving a beacon packet and a synchronization packet over the wireless network. The beacon packet can provide a first synchronization, whereas the synchronization packet can provide a second synchronization. Advantageously, the second synchronization is more accurate than the first synchronization.

Sending the synchronization packet can include generating the synchronization packet and inserting it between media packets. Receiving the synchronization packet can include receiving packets over the wireless network, distinguishing between the beacon packet and the synchronization packet, and extracting information from the synchronization packet to update a timestamp value, thereby synchronizing the clocks over the wireless network.

A method for updating a timestamp value in a slave device is also described. In this method, a sequence number of a packet received from a master device can be determined. If the packet was not sequentially received, as determined by the sequence number, then one or more pseudo-timestamps can be calculated based on the sequence number. Alternatively, if the packet was not sequentially received, then the timestamp value is not updated until sequential packets are received.

A synchronization packet in a wireless network is also described. This synchronization packet can include a frame control field and a frame body. The frame control field can identify the packet as a synchronization packet. The frame body can include a timestamp and a sequence number. Notably, the timestamp and the sequence number refer to a previously transmitted synchronization packet.

BRIEF DESCRIPTION OF THE FIGURES

FIG. 5 illustrates the layout of data in a synchronization packet.

FIG. 6B illustrates an exemplary technique that can compensate for a missing synchronization packet.

DETAILED DESCRIPTION OF THE FIGURES

Figure 1:
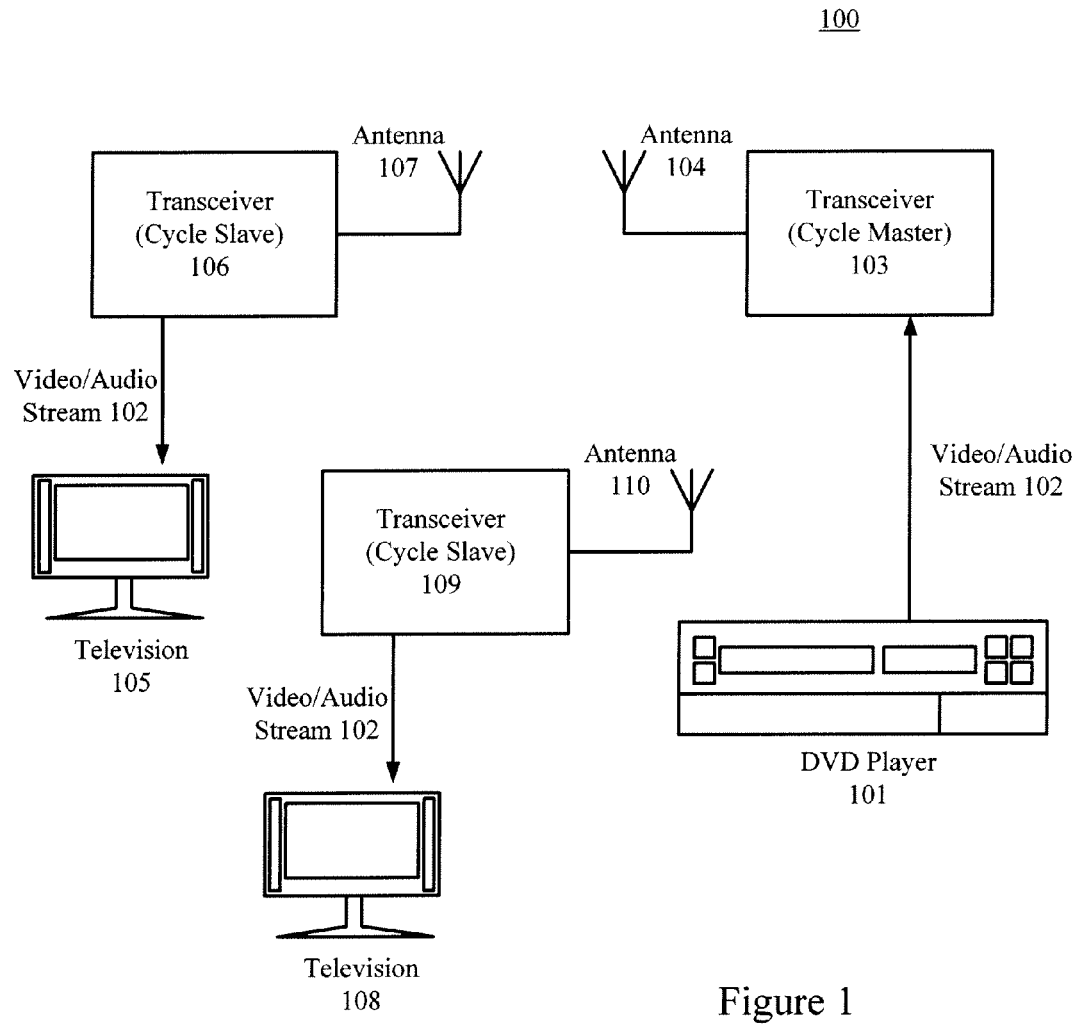
FIG. 1 illustrates a block diagram of an exemplary wireless streaming media system.

FIG. 1 illustrates an exemplary wireless media system 100 including a DVD player 101 (i.e. a source device) and televisions 105/108 (i.e. end devices) that can communicate using a wireless communication network. This wireless communication network includes transceivers 103, 106, and 109 as well as antennas 104, 107, and 110. In wireless media system 100, DVD player 101 can send a video/audio stream 102 (e.g. an MPEG-2 stream) to transceiver 103. In turn, transceiver 103, which functions as a transmitter, uses its antenna 104 to wirelessly transmit this data stream to any receivers. For example, both transceivers 106 and 109 (and their corresponding antennas 107 and 110) can function as receivers. Transceivers 106 and 109 can forward video/audio stream 102 to televisions 105 and 108, respectively. For simplicity, transceiver 103 is hereinafter called a "cycle master" whereas transceivers 106 and 109 are hereinafter called "cycle slaves".

Figure 2:
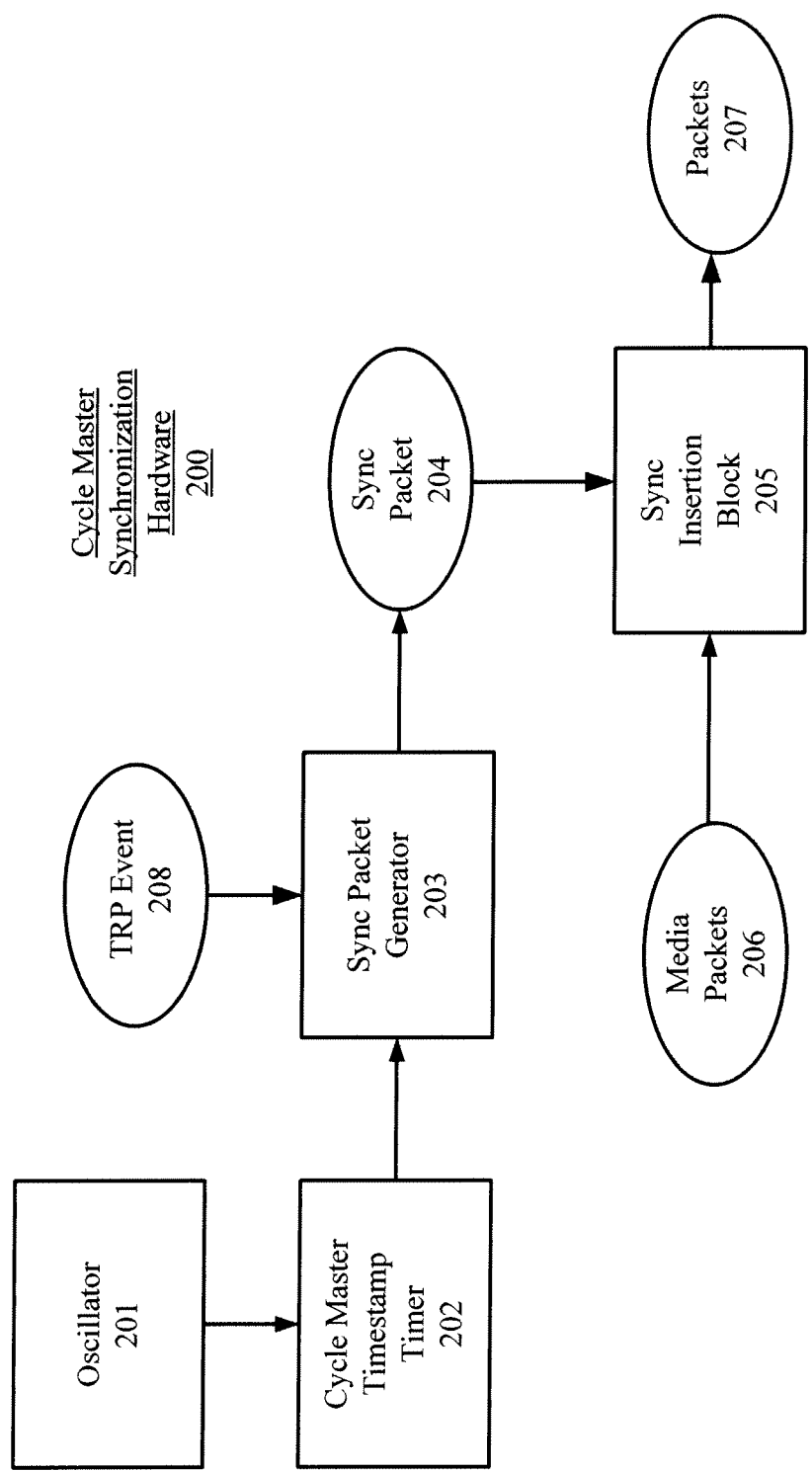
FIG. 2 illustrates a block diagram of exemplary synchronization hardware for a cycle master.

FIG. 2 illustrates exemplary synchronization hardware 200 for a cycle master. Synchronization hardware 200 can include an oscillator 201 coupled to a timestamp timer 202, thereby triggering timestamp timer 202 to increment upon each cycle of oscillator 201. (Thus, as used herein, the term "timestamp timer" counts time, not the timestamp values.) In one embodiment, oscillator 201 can be a 40 MHz crystal-based oscillator. A synchronization packet generator 203 samples the contents of timestamp timer 202 and periodically (based on a TRP event 208, described below) directs a synchronization insertion block 205 to insert a synchronization packet 204 into a stream of media packets 206. In one embodiment, synchronization packets 204 can be sent at 100 ms (or more frequent) intervals. Note that synchronization packet 204 is not merged into a media packet, but is rather interspersed between media packets 206. Thus, in one embodiment, synchronization insertion block 205 inserts synchronization packet 204 into the stream of media packets 206 as soon as possible after the receipt of synchronization packet 204. The combination of media packets 206 and synchronization packets 204, generically referenced as packets 207, are transmitted by the cycle master.

Figure 3A:
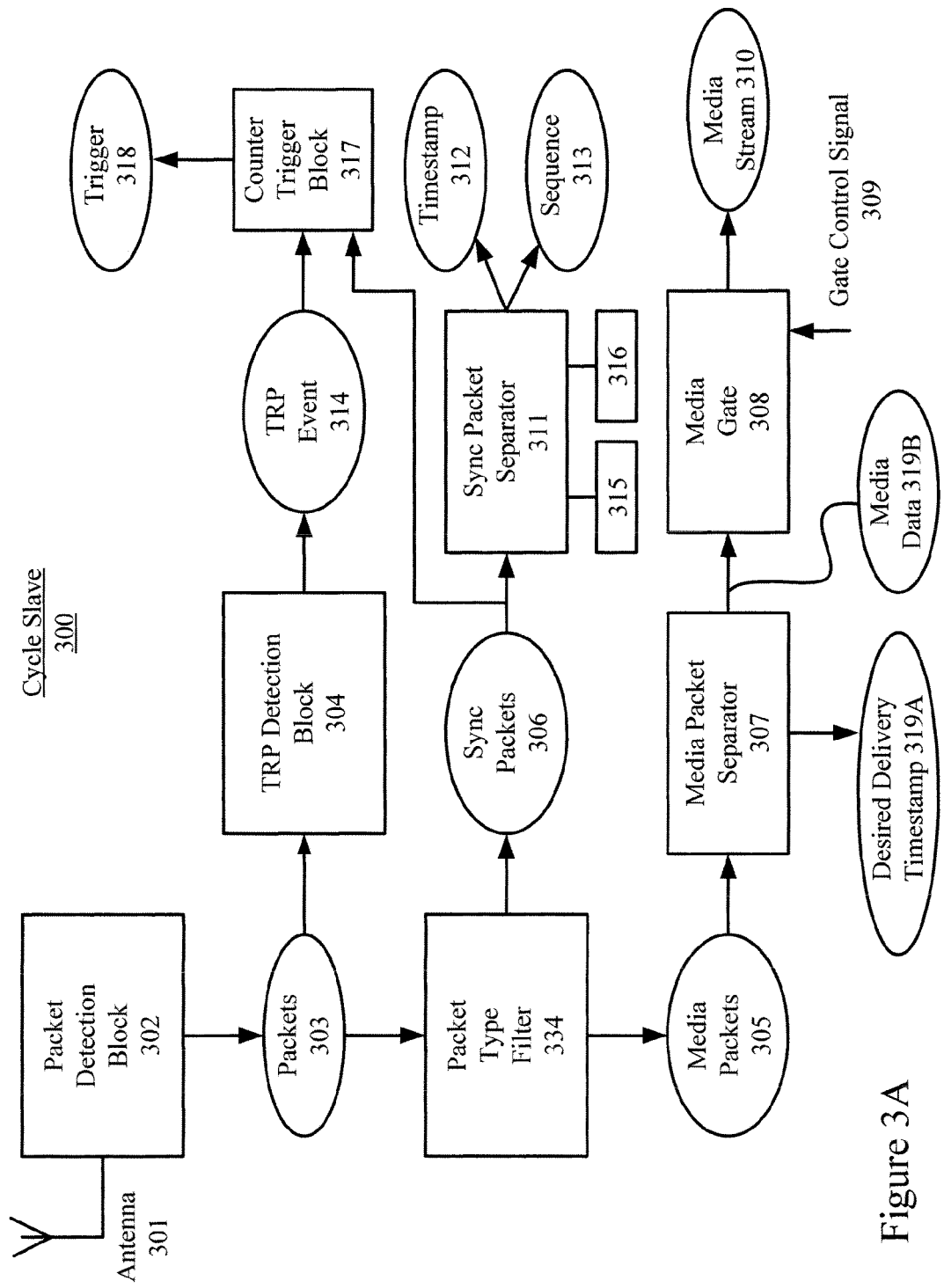
FIG. 3A illustrates a block diagram of an exemplary cycle slave.

FIG. 3A illustrates an exemplary cycle slave 300 that can receive signals using an antenna 301. These signals can be provided to a packet detection block 302, which can detect packets 303. A timing reference point (TRP) event detection block 304 can determine TRP events 314 of a packet with high accuracy (e.g. on the order of ±50 ns). For example, an exemplary TRP event 314 could be a "medium_free" event (sometimes also called an "rx_clear") that is measured between the end of one packet and the beginning of the next packet. Other stable, detectable timing points associated with a packet can be used to provide equally viable TRP events. For example, other TRP events could include, but are not limited to, the start of a packet, the end of a packet, or the start/end of a Signal field (i.e. the encoded field indicating what type of data is being transmitted).

A packet type filter 334 determines whether packets 303 are media packets 305 or synchronization packets 306. Media packets 305 can be sent to a media packet separator 307, which extracts its associated timestamp 319A (which indicates a desired delivery time for the packet), and then forwards remaining media data 319B to a media gate 308. Note that media packet 305 can conform to the format discussed in U.S. patent application Ser. No. 10/934,869, entitled "Efficient Data Transmission By Data Aggregation", filed on Sep. 3, 2004 by Atheros Communications, Inc., and incorporated by reference herein.

In one embodiment, media gate 308 can include a first-in-first-out (FIFO). Based on a gate control signal 309 (described in reference to FIG. 3B), a media gate 308 can send media packets 305 as a media stream 310. If a packet 303 is a synchronization packet 306 and a TRP event 314 occurs, then a synchronization packet separator 311 can identify a timestamp 312 and a sequence identifier 313 (both explained in reference to FIG. 4).

Figure 3B:
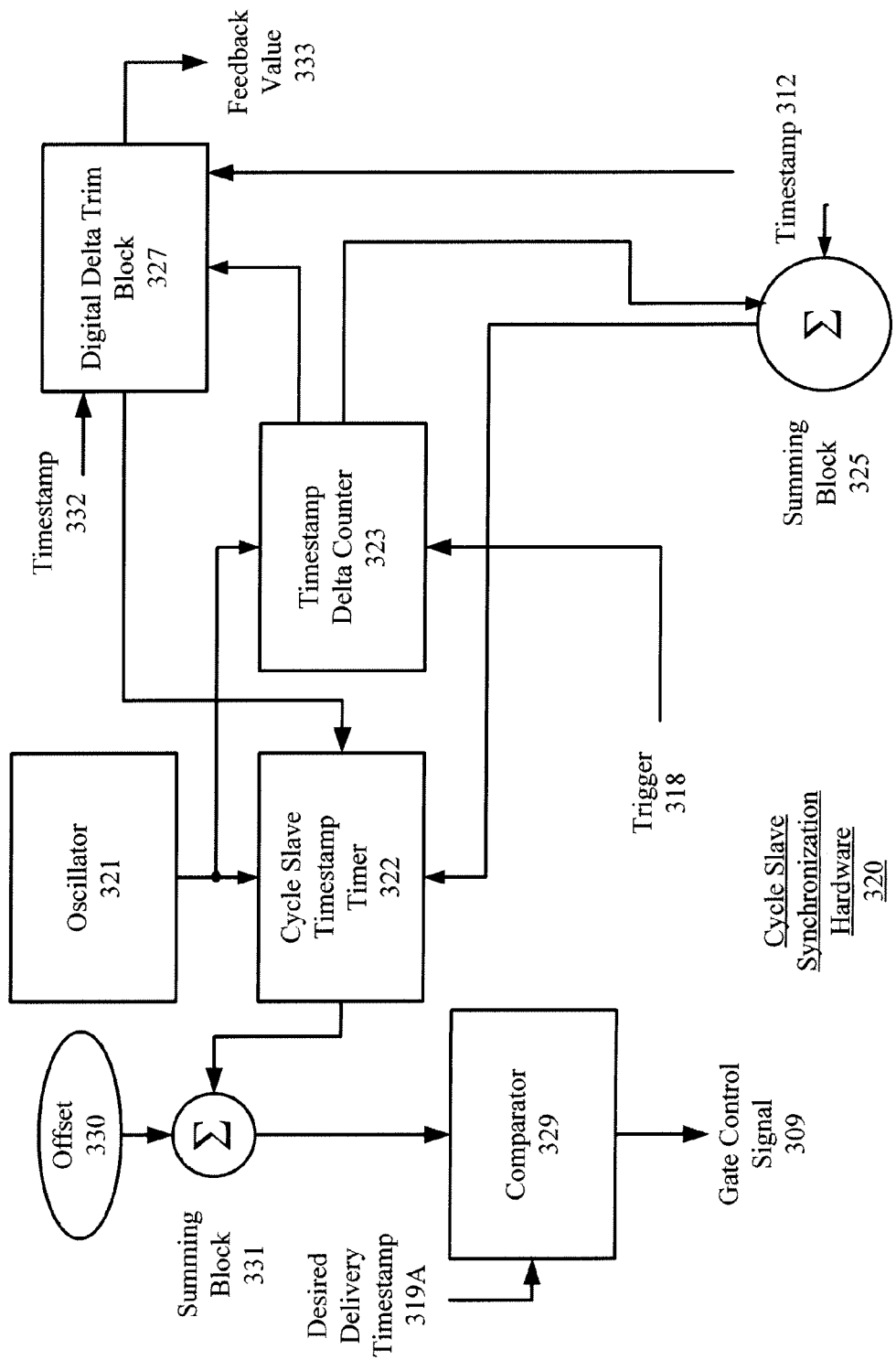
FIG. 3B illustrates a block diagram of exemplary synchronization hardware for a cycle slave.

FIG. 3B illustrates exemplary synchronization hardware 320 for a cycle slave. Synchronization hardware 320 can include an oscillator 321 coupled to a timestamp timer 322, thereby triggering timestamp timer 322 to increment upon each cycle of oscillator 321. In one embodiment, oscillator 321 can also be a 40 MHz crystal-based oscillator (i.e. a similar oscillator as used in the cycle master). In another embodiment, oscillator 321 can have a frequency different than that of the cycle master. Notably, these nominally fixed frequencies of the cycle master and cycle slave oscillators and in particular the relationship between the frequencies, can be used to perform the functions described herein.

Timestamp 312, extracted from a synchronization packet (as shown in FIG. 3A), can be sent to a summing block 325. When a first TRP event 314 is detected, trigger 318 can initialize a timestamp delta counter 323, which then begins incrementing at the same 40 MHz rate as timestamp timer 322. When a subsequent TRP event 314 occurs (once again, using trigger 318), timestamp delta counter 323 can trigger summing block 325 to add the contents of timestamp delta counter 323 to timestamp value 312 (noting that TRP event 314 generates trigger 318 before timestamp 312 changes to reflect the subsequent packet) and send that sum to update timestamp timer 322. The advantages of using this TRP event to generate a value in timestamp delta counter 323 (called a "count") are described in reference to FIG. 4.

Figure 4:
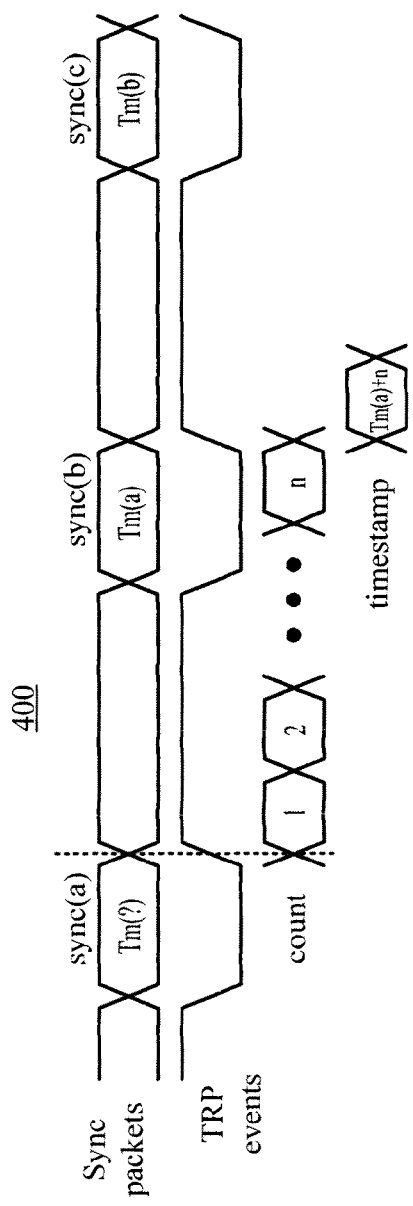
FIG. 4 illustrates a timeline diagram of received signals and, in particular, the relationship of timing reference point (TRP) events, sequential synchronization packets, and cycles counted between TRP events.

FIG. 4 illustrates a timeline diagram 400 indicating the relationship between TRP events, received synchronization packets, and cycles counted from one TRP event to a subsequent TRP event (i.e. the count). Note that the TRP events are indicated in a system (i.e. a cycle master or a cycle slave) between any two packets and not just between synchronization packets. Therefore, a synchronization packet could be transmitted/received between multiple media packets. As described previously in reference to FIG. 3A and now described in further detail in reference to FIG. 5, each synchronization packet includes a timestamp and a sequence.

FIG. 5 illustrates an exemplary layout of a synchronization packet 500. Notably, synchronization packet 500 can advantageously conform to a standard 802.11 packet. Specifically, synchronization packet 500 can include a frame control field (2 octets in length), a duration/identification field (2 octets in length), address 1-3 fields (each 6 octets in length), a sequence control field (2 octets in length), an address 4 field (6 octets in length), a frame body field (0-2312 octets in length), and an FCS field (4 octets in length). Notably, only two fields include relevant information: the frame control field 501 and the frame body 502.

In one embodiment, for packet type filter 334 (FIG. 3A) to detect that this is a synchronization packet (rather than a streaming data packet or a beacon packet, for example), software can set the frame type in frame control field 501 to indicate a synchronization packet (0x7) is being received. Note that frame type usage can be consistent with that described in the IEEE-802.11-1999 specification, §7.1.3.1.2, by using currently reserved bits.

The actual synchronization information can be provided in frame body 502. This synchronization information can include a timestamp 511 and a sequence number 512. Sequence number 512 can be compared to the sequence number of the last synchronization packet, thereby allowing a determination as to whether synchronization packets are sequentially received. Note that the values for sequence numbers are arbitrary, although consecutive sequence numbers typically vary by "1".

In one embodiment, timestamp 511 can be 4 octets in length, i.e. 32 bits (or, in one embodiment, 31 bits with 1 bit reserved), whereas sequence 512 can be 2 octets in length, i.e. 16 bits. Note that the IEEE 802.11 standard provides for the processing of data in octets. Therefore, exemplary octets for timestamp 511 (i.e. sync timestamp 0, sync timestamp 1, sync timestamp 2, and sync timestamp 3) and sequence 512 (i.e. sync sequence 0 and sync sequence 1) are shown. In one embodiment, sequence 512 can include a running, 16-bit binary count of the synchronization packets sent by the cycle master (discussed in further detail in reference to FIGS. 6A and 6B).

A timestamp offset [7:0] register 315 (FIG. 3A) can be set to specify the number of bytes from the end of the header (i.e. the end of the address 4 field) to the first byte of timestamp 511. Similarly, a sequence offset [7:0] register 316 (FIG. 3A) can be set to specify the number of bytes from the end of the header to the first byte of sequence number 512. In one embodiment, these offset registers can be controlled by the software run by synchronization packet separator 311.

Hardware detects a synchronization packet 500 when the received address 1 (i.e. the network address to which the packet is being sent) matches a synchronization multicast address [47:0] value and the Basic Service Set ID (BSSID) also matches. Note that BSSID usage is consistent with that described in the IEEE-802.11-1997 specification, §7.2.2. In one embodiment, the synchronization multicast address can also be set in a register controlled by software.

Referring back to FIG. 4, the timestamps (e.g. Tm(?), Tm(a), and Tm(b)) included within the synchronization packets (e.g. sync(a), sync(b), and sync(c)) are completely independent of the IEEE 802.11 timestamps that are transferred in beacons. Specifically, a beacon timestamp has a 1 μs resolution, whereas the synchronization timestamp can have, for example, a 10-25 ns resolution. Moreover, the cycle master that generates the synchronization packet does not need to be an access point (AP), a hybrid coordinator (HC), or even the cycle master of the multimedia data. However, in accordance with one aspect of the invention, only one cycle master is allowed in a basic service set (BSS). Based on empirical measurements of crystal oscillators typically used in wireless networking equipment, the maximum difference in the clock frequency between the cycle master and the cycle slave is assumed to be 40 ppm.

Therefore, in general, the beacon packets can provide a first relatively coarse synchronization, whereas the synchronization packets can provide a second synchronization, wherein the second synchronization can be significantly more accurate than the first synchronization. This accurate synchronization is particularly useful for applications that wirelessly transmit streaming media data.

Advantageously, a baseband data formatter can indicate with accuracy the rising edge of a TRP event. As noted previously, TRP events can be generated after both synchronization and media packets. Therefore, in one embodiment shown in FIG. 3A, a counter trigger block 317 can receive both TRP events 314 as well as synchronization packets 306, thereby triggering a count that conforms with that shown in FIG. 4.

Specifically, in accordance with one aspect of the invention, the count can include the number of cycles between the end of one synchronization packet (e.g. sync (a), the first synchronization packet) and the end of the next synchronization packet (e.g. sync (b)). Notably, time synchronization relies on a synchronization packet that includes the timestamp at the rising edge of a TRP event for a previous synchronization packet that was sent. For example, sync (b) cannot include its own timestamp because the rising edge of a TRP event occurs after sync(b) has completed transmission. Therefore, sync(b) can include the timestamp Tm(a), which is associated with sync(a). For this reason, sync(a) has a "don't care" timestamp Tm(?), which is not used (i.e. ignored).

When the cycle slave receives a synchronization packet, a summing block (e.g. summing block 325 in FIG. 3B) can update its version of the timestamp (e.g. the value stored in timestamp timer 322) to the value of the received timestamp (e.g. timestamp 312) plus the count (e.g. Tm(a)+n). Note that in one embodiment, two synchronization packets must be received sequentially to perform an update on the timestamp. Notably, because the local timestamps of the cycle master and the cycle slave as well as the timestamp timer are generated by oscillators having substantially the same frequency, then Tm(a)+n should be equal to Tm(b) if there is no drift. That is, any drift between the two oscillators can be advantageously detected by measuring the difference between Tm(a)+n and Tm(b).

Notably, synchronization hardware 200 (FIG. 2) of the cycle master is tolerant to significant amounts of jitter because the insertion of the timestamp (e.g. timestamp 511) occurs in hardware as the synchronization packet is transmitted. In this manner, the synchronization packets can present an accurate accounting of transmit delays due to software or carrier-sensing delays. In one embodiment, because sequences are assigned based on specific timing constraints, software can queue the synchronization packets with their corresponding sequences, e.g. sequence 512, before transmission occurs.

As indicated above and referring back to FIGS. 3A and 3B, media packets 305 are held temporarily by media gate 308. Specifically, when the value stored by timestamp timer 322 (or a derivative value discussed below) is later than timestamp 319A (wherein timestamp 319A indicates a desired delivery time), then a comparator 329 outputs a gate control signal 309 that is provided to media gate 309. This gate control signal 309 triggers media gate 308 to send media data 319B in a media stream 310 to the end device for display.

In one embodiment, a summing block 331 can add a constant offset 330 to the value stored in timestamp timer 322 before it is used by media gate 308, thereby advantageously forming a fixed output delay for media stream 310. This delay effectively creates a buffer, which may be sized such that stream interruptions, for example, a retransmission of a packet incorrectly received, does not cause a stall in the flow of media stream 310.

In one embodiment, a digital delta trim block 327 can alter the increments used by timestamp timer 322. Specifically, digital delta trim block 327 may "tune" the increment based on a difference between the counts (as computed by timestamp delta counter 323) and timestamps 312. (Note that if both 40 MHz clocks in the cycle master and the cycle slave were running with exactly the same frequency, then the count and the difference in timestamps at the cycle slave would be the same.)

In a typical embodiment, time stamp counter 322 can increment by "1" on every cycle. However, in another embodiment, quicker agreement of cycle master and cycle slave clocks may be achieved by occasionally incrementing the value stored in timestamp timer 322 by 2 when the cycle slave clock is too slow. In yet another embodiment, quicker agreement of cycle master and cycle slave clocks may be achieved by occasionally incrementing the value stored in timestamp timer 322 by 0 when the cycle slave clock is too fast. Increment values other than +1 are referred to as "tuning" events and can occur every I samples apart ("span").

Table 1 provides exemplary values illustrating the input data for a calculation of a span between a choice of a timestamp timer increment other than +1 and the choice of increment. Table 2 indicates the calculated tuning parameters using the exemplary values of Table 1. Note that the cycle slave timestamps (e.g. Ts(a) and Ts(b), generically shown as timestamp 332 in FIG. 3B) can be generated using hardware similar to that used in the cycle master (i.e. timestamp timer 202 and synchronization packet generator 203 shown in FIG. 2). In Table 2, the exemplary choices for alternative increment amounts are +2 and +0. Note that the synchronization packets shown in FIG. 4 (i.e. sync(a) and sync(b)) are used in the computations for illustration purposes.

TABLE 1

Delta Trim Calculation Exemplary Data

| Name  | Definition              | Example |
|-------|-------------------------|---------|
| I     | Current span value      | 100     |
| Ts (a)| Time at slave at sync (a)| 997    |

TABLE 1-continued

Delta Trim Calculation Exemplary Data

| Name | Definition | Example |
|---|---|---|
| Ts (b) | Time at slave at sync (b) | 2002 |
| Tm (a) | Time at master at sync (a) | 1000 |
| Tm (b) | Time at master at sync (b) | 2000 |
| Ds | Time interval between sync (a) and sync (b) at slave | |
| Dm | Time interval between sync (a) and sync (b) at master | |
| E | Error: Difference between Ds and Dm | |
| S | Number of tuning events between sync (a) and sync (b) | |
| S' | Next version of S | |
| I' | Next version of I | |

TABLE 2

Calculated Tuning Parameters

| Name | Equation | Calculation | Result |
|---|---|---|---|
| Ds | =Ts (b) − Ts (a) | =2002 − 997 | =1005 |
| Dm | =Tm (b) − Tm (a) | =2000 − 1000 | =1000 |
| E | =Ds − Dm | =1005 − 1000 | =5 |
| S | =Ds/I | =1005/100 | =10 |
| S' | =S − E | =10 − 5 | =5 |
| I' | =Ds/S' | =1005/5 | =201 |

In this example, the time interval between sync(a) and sync(b) at the cycle slave (Ds) is 1005 cycles. That is, 1005 cycles have been measured between synchronization packets at the cycle slave. In contrast, the time interval between sync(a) and sync(b) at the cycle master (Dm) is 1000 cycles. That is, 1000 cycles have been measured between synchronization packets at the cycle master. The difference between Ds and Dm, i.e. the error (E), is 5 cycles. The previously determined number of tuning events (S), as determined by dividing Ds by the current span value (I), is 10 cycles. Therefore, the number of cycle slave clock cycles between synchronization packets should be reduced by 5. This value corresponds to the next version of S (S'). The next version of I (I'), which is determined by dividing Ds by S', is 201 cycles.

Because the number of cycles measured between synchronization packets at the cycle slave exceeds the corresponding number of cycles at the cycle master, the increment value chosen for a tuning event is +0. In this example, the desired reduction in cycle slave clock cycles can be accomplished by performing 5 tuning events in which increments are +0 instead of +1. In one embodiment, if the number of cycles measured between synchronization packets at the cycle master exceeds the corresponding number of cycles at the cycle slave, the increment value chosen for a tuning event could be set instead to +2.

In some embodiments, the rate at which synchronization packets are transmitted can be varied. By initially sending more frequent synchronization packets, digital delta trim block 327 may receive more frequent updates and thus more quickly adapt the slave clock rate to the master clock rate. This adjustment advantageously accommodates a quick clock adjustment with a subsequent reduction in synchronization packet rate, thereby conserving shared bandwidth.

In one embodiment, the rate of synchronization packets can be adjusted by digital delta trim block 327 sending a feedback value 333 to the cycle master, wherein feedback value 333 indicates a measure of change in tuning values. For example, greater variation in digital delta trim block tuning values would trigger an increase in the synchronization packet rate. This rate adjustment technique can advantageously dynamically allocate synchronization packet bandwidth concomitant with need.

Figure 6A:
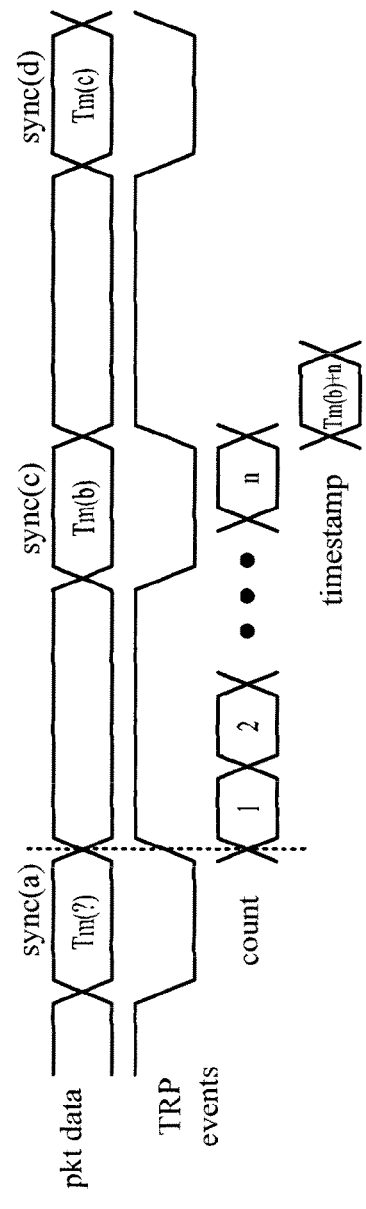
FIG. 6A illustrates another timeline diagram of received signals and, in particular, the relationship of TRP events, non-sequential synchronization packets, and cycles counted between TRP events.

FIG. 6A illustrates a timeline diagram 600 indicating the relationship between TRP events, synchronization packets, and cycles counted from one TRP event to a subsequent, but not immediately sequential, TRP event (i.e. the sequence number between sync(a) and sync(c) will not be sequential). In this case, hardware should detect that at least one synchronization packet has been lost. Under these circumstances, the timestamp is difficult to update because the count is counting from the rising edge of timing for sync(a), and timestamp Tm(b) (included in synchronization packet sync(c)) assumes that a count from sync(b) has been made. Therefore, in one embodiment, the above-described missing synchronization packet can be handled by calculating one or more pseudo-timestamps representing a timestamp history and selecting the correct timestamp(s) for the calculation based on the received sequence number.

For example, if, in a synchronization packet, multiple timestamps representing the current timestamp associated with a sequence number n, $\{TS_n, TS_{n-1} \ldots TS_{n-m}\}$, the difference in received, non-sequential sequence numbers can be used to select, for m skipped sync packets, a $TS_{n-m}$ for processing, because the previously received synchronization packet and currently received, non-sequential synchronization packet include sufficient information (assuming less than m synchronization packets have been lost) to treat the previously received synchronization packet and the currently received, non-sequential synchronization packet as though they were, effectively sequential. Advantageously, these additional timestamps (and associated synchronization packets) represent a small overhead (4 bytes per additional timestamp) over a single synchronization packet. In one embodiment, a timestamp value is not updated until sequential packets are received.

FIG. 6B illustrates an exemplary technique that can compensate for a missing synchronization packet. Step 610 determines if a received packet is in sequential order by comparing its sequence number, e.g. sequence number 512 (FIG. 5), and the sequence number of the last received synchronization packet. If the sequence numbers are sequential, then step 611 continues to process the synchronization packet. If the sequence numbers are not sequential, then step 612 can advantageously calculate one or more pseudo timestamps based on the current timestamp and a number of previously sent timestamps, wherein frame body 502 could include multiple timestamps 511 (e.g. timestamps 511A-511D, shown in the dashed box, each having 4 octets), called herein a compiled timestamp 511'.

For example, in one embodiment, a timestamp represents a time delta as measured by a TRP event (e.g. "medium_free" event). Compiled timestamp 511' could include a compilation of synchronization timestamps, e.g. the current timestamp and from the last three previously sent timestamps. By comparing the received compiled timestamps 511', the redundant information provided in timestamps 511A-511D can advantageously facilitate a reconstruction of probable timestamps that are missing. That is, assuming that four timestamps are provided in compiled timestamp 511', then sequential packets should have three identical timestamps. If only two timestamps are identical, then one packet has not been received. However, by using the two identical timestamps and the current timestamp, a pseudo timestamp for the missing packet can be calculated.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, the IEEE-802.11-1997 specification provides a Frame Check Sequence (FCS) mechanism for detecting corrupted data packets. In one embodiment, software can perform a further validation of timestamp data by using the value stored in the FCS field of synchronization packet 500 (FIG. 5). Specifically, the software can check that the time reported in the timestamp is not inconsistent (i.e. a timestamp substantially greater than can be accounted for by relative clock drift) with previous timestamps, and the synchronization packet may be rejected if this check fails.

Figure 7:
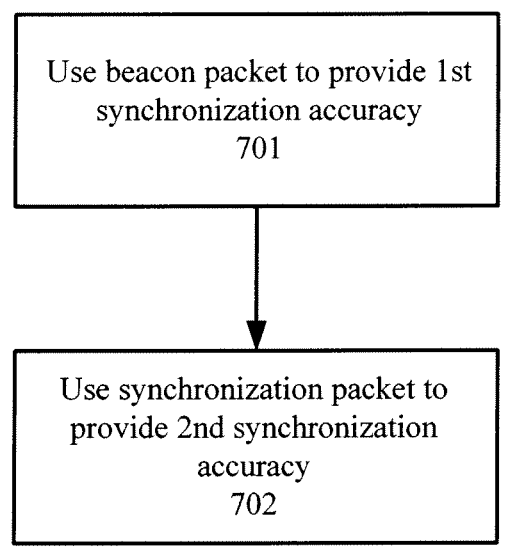
FIG. 7 illustrates a method of synchronizing two clocks in source and end devices.

In one embodiment, both the beacon and the synchronization packets can provide synchronization functions. For example, referring to FIG. 7, a method 700 of synchronizing two clocks in source and end devices is provided. In step 701, a beacon packet can be used to provide a first synchronization accuracy. In step 702, a synchronization packet can be used to provide a second synchronization accuracy, wherein the second synchronization accuracy can be significantly better than the first synchronization accuracy. In one embodiment, performing step 701 before step 702 can facilitate more quickly attaining the second synchronization accuracy. That is, once the first, rough synchronization accuracy is achieved, fine tuning the synchronization using the above-described methods (see, for example, FIGS. 3A, 3B, and 4) can rapidly achieve the second, more accurate synchronization. With such improved synchronization accuracy, streaming media can be transmitted from the source device to the end device with minimal jitter.

Accordingly, it is intended that the scope of the invention be defined by the following Claims and their equivalents.

The invention claimed is:

1. A method of synchronizing a first clock in a first device and a second clock in a second device using a wireless network, the method comprising:
sending or receiving a beacon packet over the wireless network, the beacon packet providing a first synchronization;
configuring a timestamp of a synchronization packet with a finer resolution than a timestamp of the beacon packet; and
sending or receiving the synchronization packet over the wireless network, the synchronization packet including a frame body that consists of information regarding a second synchronization, wherein the second synchronization is more accurate than the first synchronization based at least in part on the timestamp of the synchronization packet having the finer resolution than the timestamp of the beacon packet.

2. The method of claim 1, wherein receiving the synchronization packet further includes gating a media packet based on a gate control signal generated by a gate generator.

3. The method of claim 2, wherein the gate control signal is generated using an offset value.

4. The method of claim 1, wherein sending the synchronization packet includes:

generating the synchronization packet using a first timestamp associated with the first device; and
inserting the synchronization packet between media packets.

5. The method of claim 4, wherein the first timestamp in the first device is generated by a first oscillator coupled to a first timestamp timer.

6. The method of claim 1, wherein receiving the synchronization packet includes:
receiving packets over the wireless network;
distinguishing between the beacon packet and the synchronization packet; and
extracting a first timestamp associated with the first device from the synchronization packet.

7. The method of claim 6, wherein receiving the synchronization packet further includes detecting a timing reference point event in the second device.

8. The method of claim 7, wherein receiving the synchronization packet further includes initializing a timestamp delta counter based on the timing reference point event.

9. The method of claim 8, wherein receiving the synchronization packet further includes updating a second timestamp stored in a second timestamp timer based on a value in the timestamp delta counter and the first timestamp.

10. The method of claim 9, wherein the second timestamp timer and the timestamp delta counter are incremented by a second oscillator.

11. The method of claim 1, wherein receiving the synchronization packet further includes gating a media packet based on a gate control signal derived from an output of a timestamp timer.

12. The method of claim 11, wherein the gate control signal is the output of the timestamp timer.

13. The method of claim 11, wherein the gate control signal is the output of the timestamp timer added to an offset value.

14. An apparatus for synchronizing a first clock in a first device and a second clock in a second device using a wireless network, the apparatus comprising:
a transceiver to send or receive a beacon packet over the wireless network, the beacon packet providing a first synchronization;
a synchronization packet generator to configure a timestamp of a synchronization packet with a finer resolution than a timestamp of the beacon packet and send the synchronization packet over the wireless network, the synchronization packet including a frame body that consists of information regarding a second synchronization, wherein the second synchronization is more accurate than the first synchronization based at least in part on the timestamp of the synchronization packet having the finer resolution than the timestamp of the beacon packet.

15. The apparatus of claim 14, wherein the gate control signal is generated using an offset value.

16. The apparatus of claim 14, wherein sending the synchronization packet includes:
generating the synchronization packet using a first timestamp associated with the first device; and
inserting the synchronization packet between media packets.

17. The apparatus of claim 16, wherein the first timestamp in the first device is generated by a first oscillator coupled to a first timestamp timer.

\* \* \* \* \*